US010425351B2

(12) United States Patent
Eriksson et al.

(10) Patent No.: US 10,425,351 B2
(45) Date of Patent: Sep. 24, 2019

(54) ALLOCATION OF RESOURCES FOR REAL-TIME COMMUNICATION

(71) Applicant: Telefonaktiebolaget LM Ericsson (publ), Stockholm (SE)

(72) Inventors: Göran Eriksson, Norrtälje (SE); Markus Andersson, Boden (SE); Bo Burman, Upplands Väsby (SE); Magnus Westerlund, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 261 days.

(21) Appl. No.: 15/034,421

(22) PCT Filed: Nov. 8, 2013

(86) PCT No.: PCT/SE2013/051321
§ 371 (c)(1),
(2) Date: May 4, 2016

(87) PCT Pub. No.: WO2015/069165
PCT Pub. Date: May 14, 2015

(65) Prior Publication Data
US 2016/0269315 A1    Sep. 15, 2016

(51) Int. Cl.
*G06F 15/173* (2006.01)
*H04L 12/927* (2013.01)
(Continued)

(52) U.S. Cl.
CPC ........ *H04L 47/801* (2013.01); *H04L 41/0893* (2013.01); *H04L 41/0896* (2013.01);
(Continued)

(58) Field of Classification Search
CPC ............ H04L 65/1006; H04L 65/1053; H04L 65/608; H04L 67/02; H04L 67/141; C07F 7/1836; C07F 7/1876
See application file for complete search history.

(56) References Cited

U.S. PATENT DOCUMENTS 7,647,418 B2 *    1/2010  Ash ................... H04L 41/5009
                                              709/231
7,730,030 B1 *    6/2010  Xu ......................... G06Q 10/10
                                              707/617
(Continued)

FOREIGN PATENT DOCUMENTS

EP            2273751 A2        1/2011
WO      WO2008119929     *   3/2008   ............ H04L 12/24
WO         2008119929 A2    10/2008

*Primary Examiner* — John B Walsh
(74) *Attorney, Agent, or Firm* — Murphy, Bilak & Homiller, PLLC

(57) ABSTRACT

There is provided mechanism for providing Web based applications with network information. A need for a Web based application to transmit a real time media flow is acquired. Transport characteristics relating to transmission of the real time media flow over a communications network is acquired. From the acquired transport characteristics and according to a policy criterion a resource allocation to the real time media flow is determined. The determined resource allocation is provided to at least one of the Web based application and a browser associated with the Web based application.

20 Claims, 5 Drawing Sheets

(51) Int. Cl.
  *H04L 12/24* (2006.01)
  *H04L 29/06* (2006.01)
  *H04L 12/851* (2013.01)
  *H04L 12/911* (2013.01)
  *H04L 29/08* (2006.01)
  *H04W 72/08* (2009.01)

(52) U.S. Cl.
  CPC ........ *H04L 47/2408* (2013.01); *H04L 47/781* (2013.01); *H04L 47/805* (2013.01); *H04L 65/1063* (2013.01); *H04L 65/1069* (2013.01); *H04L 65/80* (2013.01); *H04L 67/02* (2013.01); *H04L 67/141* (2013.01); *H04W 72/087* (2013.01); *H04L 41/509* (2013.01); *H04L 41/5019* (2013.01); *H04L 41/5025* (2013.01); *H04L 41/5067* (2013.01); *H04L 41/5083* (2013.01); *H04L 41/5087* (2013.01)

(56) References Cited

U.S. PATENT DOCUMENTS

| | | | |
|---|---|---|---|
| 7,835,275 B1 | 11/2010 | Swan et al. | |
| 8,005,950 B1* | 8/2011 | Ashcraft | G06F 9/5016 709/217 |
| 8,271,618 B1* | 9/2012 | Kridlo | H04L 67/06 709/219 |
| 8,291,110 B2* | 10/2012 | Pishevar | H04L 67/1095 709/238 |
| 8,626,804 B2* | 1/2014 | Xu | G06Q 10/10 707/817 |
| 8,819,238 B2* | 8/2014 | Ashcraft | G06F 9/5016 709/203 |
| 2002/0085529 A1* | 7/2002 | Koromyslichenko | H04L 12/2856 370/338 |
| 2007/0033264 A1* | 2/2007 | Edge | H04L 29/12066 709/217 |
| 2008/0025535 A1* | 1/2008 | Rajapakse | H04L 65/605 381/311 |
| 2012/0069131 A1* | 3/2012 | Abelow | G06Q 10/067 348/14.01 |
| 2013/0227106 A1* | 8/2013 | Grinshpun | H04W 4/18 709/223 |
| 2013/0326034 A1* | 12/2013 | Shaik | H04L 41/0816 709/223 |
| 2015/0039687 A1* | 2/2015 | Waxman | H04L 67/02 709/204 |

* cited by examiner

ALLOCATION OF RESOURCES FOR REAL-TIME COMMUNICATION

TECHNICAL FIELD

Embodiments presented herein relate to a communications network, and particularly to a method, a network information system, a computer program, and a computer program product for providing network information in a communications network.

BACKGROUND

In communication networks, there is always a challenge to obtain good performance and capacity for a given communications protocol, its parameters and the physical environment in which the communication network is deployed.

Existing real-time audio-visual communication services, including the 3GPP (3rd Generation Partnership Project) technical standard TS 26.114 (MTSI; Multimedia Telephony Service for Internet Protocol Multimedia Subsystem) and the profile called IR.94 in GSMA (the Global System for Mobile Communications Association), use SIP/SDP (Session Initiation Protocol/Session Description Protocol) as signaling to configure and setup a call between two user equipment (UE), and use the Internet Protocol (IP), the User Datagram Protocol (UDP) and the Real-time Transport Protocol (RTP) to encapsulate a (compressed representation of) media data during transport, on top of any chosen physical transport medium.

One approach to handle service and mobile broadband (MBB) transport is to configure an application run on a connected device to use a constant bitrate and to configure and dimension the transport resources to, with a sufficiently high probability, provide the needed resource. One issue may concern how to utilize the capacity available in a heterogeneous transport network; commonly, the maximum bitrate used is set according the lowest expected but highly available capability.

Another approach is to configure the application to adapt to changing transport prerequisites in the media end point devices (i.e., at connected devices). This adaptation could be based on measurements in the end points and service specific implementations that perform the adaptation. The adaptation may include stopping the transmission of media components, such as the video component.

In general terms, the user experience of services involving real time media, such as speech and conversational video, in a communications environment with constrained transport resources, such as in a public mobile broadband cell, is negatively impacted by packet loss, jitter and possibly packet reordering. Developing and configuring the service to adapt to varying transport prerequisites may be challenging, especially when channel conditions are subject to rapid, sporadic changes. Providing the network developer and network service provider with tools for managing this uncertainty by exposing explicit information from the radio link layer is one approach for providing a better user experience.

Further, transport conditions in a mobile broadband cell may be changing so fast that an end point device cannot detect changes as they occur. Also, the change itself may not be easily predictable. The transmission capacity of the wireless link for a particular user and radio bearer varies. The actual maximum transmission capacity may only be determined by having a standing queue for the radio scheduler scheduling packets of the user and radio bearer. In general terms, a standing queue is equivalent to delay, which is undesirable for a real-time application.

Further, IP protocols do not give any indication regarding how under-utilized the currently available capacity for a flow is. The amount of network traffic must be quickly increased to successfully probe after available capacity when no signs of over-utilization are present. When this rapid increase of network traffic reaches the actual capacity limit of the network a significant overshot may occur due to the delay in the network. In such cases a significant queue, and thus one-way delay, will be built up in the network, thus reducing the user experience of the service. At least these reasons may make it difficult to deploy probing, thus preventing the end point device to adapt in pace with the changing network conditions.

Examples of current mechanisms for adapting conversational applications in browser platforms and IP networks will now be summarized. In the following, with a browser platform is meant the browser as defined in the World Wide Web Consortium (W3C) and the Web Hypertext Application Technology Working Group (WHATWG), exemplified by Chrome, Safari, etc., and the associated network entities for which the browser is designed to interact with.

With IP networks is meant the IP network as defined by the Internet Engineering Task Force (IETF). In the below text it, the term IP platform will be used meaning the collection of technologies developed for IP networks, while with IP network is meant a sample deployment of said technologies. In both cases the understanding of the term includes both existing and future developments of the technologies in the browser and IP platform.

Real time communication in browsers is about to become standardized with the event of Web Real-Time Communication (WebRTC). WebRTC aims to enable the web with Real Time Communication (RTC) capabilities. Previously, this need has been fulfilled by plugins, such as Adobe Flash.

Currently, the browser includes the media framework used for encoding and decoding the input to and from camera, microphone, speaker and screen of the device on which the browser is run, and maps the data onto the transport mechanisms in the IP platform. The web application interacts with the media framework and underlying device resources using Web Application Programming Interfaces (APIs). The interaction is subject to a security mode related assumptions underlying web applications, meaning in particular that the Java Scripts (JSs) have limited rights to access and control underlying resources.

The mechanisms involved in the browser and the IP network interact to fulfill several objectives including avoiding congestion in the network and in the end-points (hosts) as well as provide the application with means to monitor and control the application behavior.

In the browser, rate control is implemented in several protocols used to implement the Web APIs. One example is the TCP protocol rate control used as part of the implementation of the XHR Web API for HTTP (Hypertext Transfer Protocol) connections between the browser and a web server, where XHR is short for XMLHttpRequest, where XML is short for Extensible Markup Language.

In general terms, the WebRTC API offers the web application to exchange three kinds of data streams to a peer, typically another browser with a web application using the WebRTC API: audio (e.g. speech), video (e.g. conversational) and a datagram service. The audio and video streams may be unidirectional or bidirectional. The audio and video streams are using RTP/UDP (Real-time Protocol/User Datagram Protocol) transport which is a connectionless, unreliable transport, while the datagram is intended to be using a TCP-like reliable, stream oriented transport.

Rate control mechanisms for UDP based streams fulfilling the IP platform requirements on congestion and flow control are being developed. The WebRTC media framework rate control may need to handle rate adaptation for greatly varying transport characteristics as well as large and fast variations on the multimedia traffic flows being generated. In doing this, the media framework where the different rate control related processes resides, may consider making assumptions about the end-to-end transport characteristics of the data path between the sender and the receiver and use this when putting the generated multimedia traffic flows onto the transport in form of frames and RTP packets.

Issues with such an end-point focused adaptive rate control include that any associated traffic predictions may have difficulties following fast changing rate changes in the network, and that the mechanism for detecting a possible up-ramping of the available bitrate may overshoot and hence fill buffers causing packet loss or delay, which in turn will decrease the quality of the user experience. Avoiding this may instead mean a loss of efficiency in using available transport resources.

Another issue may concern a split of responsibility and control between the Web application and the browser using the standard Web API, which together with the inherent security model causes restrictions, for instance that the web application (e.g., a web page) may not be trusted to set flow characteristics in some circumstances.

Hence, there is still a need for providing improved network information in a communications network.

SUMMARY

An object of embodiments herein is to provide improved network information in a communications network.

In general terms, the user experience of real time media services, such as speech and conversational video, in an environment with constrained transport resources, such as in a public mobile broadband cell, is negatively impacted by packet loss, jitter and possibly reordering. The inventors of the enclosed embodiments have realized that designing and configuring such services to adapt to varying transport prerequisites is challenging. Giving the developer and service operator tools for managing this uncertainty by exposing explicit information is one approach for providing a better user experience.

The inventors of the enclosed embodiments have further realized that if mechanisms for providing network information are built on browser platforms and on IP networks, the mechanisms would need to be built according to the limitations and capabilities of these technologies, making any network feedback mechanisms fit the mechanisms available in the browser and IP network. As an example, information from the network about available bitrate may be seen as a congestion indication which the browser must follow or as a hint of available bitrate to be used in adapting the application to prevailing and predicted connectivity situation.

Thus, a particular object of embodiments herein is to provide improved network information in a communications network for Web based applications.

According to a first aspect there is presented a real-time communication (RTC) helper server for providing Web based applications with network information. The RTC helper server comprises a processing unit and a storage medium. The storage medium comprises instructions executable by the processing unit. The RTC helper server is operative to acquire a need for a Web based application to transmit a real time media flow. The RTC helper server is operative to acquire transport characteristics relating to transmission of the real time media flow over a communications network. The RTC helper server is operative to determine, from the acquired transport characteristics and according to a policy criterion, a resource allocation to the real time media flow. The RTC helper server is operative to provide the determined resource allocation to at least one of the Web based application and a browser associated with the Web based application.

Advantageously this provides improved network information in a communications network.

According to a second aspect there is presented a method for providing Web based applications with network information. The method comprises acquiring a need for a Web based application to transmit a real time media flow. The method comprises acquiring transport characteristics relating to transmission of said real time media flow over a communications network. The method comprises determining, from the acquired transport characteristics and according to a policy criterion, a resource allocation to the real time media flow. The method comprises providing the determined resource allocation to at least one of the Web based application and a browser associated with the Web based application.

According to a third aspect there is presented a computer program for providing Web based applications with network information, the computer program comprising computer program code which, when run on a RTC helper server, causes the RTC helper server to perform a method according to the second aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
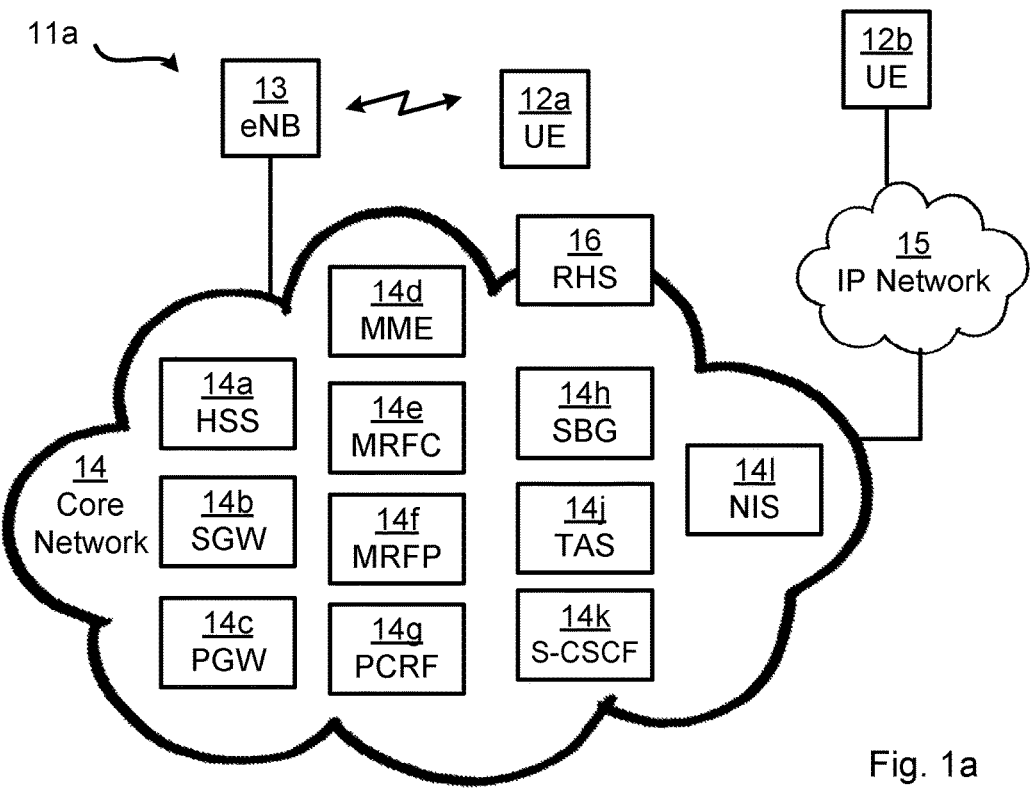
FIGS. 1a and 1b are schematic diagrams illustrating communication networks according to embodiments.

FIG. 1a shows a schematic overview of an exemplifying communications network 11a where embodiments presented herein can be applied. The communications network 11a comprises a network node (NN) 13 providing network coverage over cells (not shown). A user equipment (UE) 12a, positioned in a particular cell is thus provided network service by the network node 13 serving that particular cell. As the skilled person understands, the communications network 11a may comprise a plurality of network nodes 13 and a plurality of UEs 12a operatively connected to at least one of the plurality of network nodes 13. The network node 13 is operatively connected to a core network 14. The core network 14 comprises a network information system (NIS) 16, which will be further disclosed below. The core network 14 may provide services and data to the UE 12a operatively connected to the network node 13 from an external Internet Protocol (IP) packet switched data network 15. At least parts of the communications network 11a may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), WiFi, microwave radio links, HSPA (High Speed Packet Access), etc., as long as the principles described hereinafter are applicable.

A UE 12b may further have a wired connection to the external IP packet switched data network 15. Examples of UEs 12a, 12b include, but are not limited to end-user equipment such as mobile phones, tablet computers, laptop computers, and stationary computers. In general terms, a UE 12a, 12b as herein disclosed may have either a wireless connection, or a wired connection, or both a wireless connection and a wired connection to the IP packet switched network 15. Hence the communications network 11a may comprise any combinations of purely wirelessly connected UEs 12a, purely wired connected UEs 12b, and UEs 12a, 12b with both wireless and wired connections.

The core network 14 comprises a Home Subscriber Server (HSS) 14a, or User Profile Server Function (UPSF). The HSS is a master user database that supports the IMS network entities that actually handle calls. In general terms, it comprises subscription-related information (subscriber profiles), performs authentication and authorization of the user, and can provide information about the subscriber's location and IP information.

The core network 14 comprises a serving gateway (SGW) 14b and a packet data network (PDN) gateway (PGW) 14c which deal with the user plane. They transport the IP data traffic between the User Equipment (UE) and external networks, such as the IP network 15. The SGW is the point of interconnect between the radio-side and the packet core network. As its name indicates, this gateway serves the UE by routing the incoming and outgoing IP packets. It is the anchor point for the intra-LTE mobility (i.e. in case of handover between eNodeBs) and between LTE and other 3GPP accesses. It is logically connected to the other gateway, the PGW. The PGW is the point of interconnect between the packet core network and external IP networks 15. The PGW also performs various functions such as IP address/IP prefix allocation or policy control and charging.

The core network 14 comprises a Mobility Management Entity (MME) 14d which deals with the control plane. It handles the signalling related to mobility and security for E-UTRAN access. The MME is responsible for the tracking and the paging of UE in idle-mode. It is the termination point of the Non-Access Stratum (NAS).

The core network 14 comprises a Policy and Charging Rules Function (PCRF) 14g. In general terms, the PCRF is the network node designated in real-time to determine policy rules in the multimedia network.

The core network 14 comprises a telecom application server (TAS) 14j. The TAS may be either a software framework that provides a generalized approach to creating an application-server implementation, without regard to what the application functions are, or the server portion of a specific implementation instance. In either case, the function of the TAS is dedicated to the efficient execution of procedures (programs, routines, scripts) for supporting its applied applications.

The core network 14 comprises a Serving Call Session Control Function (S-CSCF) 14k. The S-CSCF is the central node of the signalling plane. It is a SIP (session Initiation Protocol) server, but performs session control too. It is located in the home network. It uses Diameter Cx and Dx interfaces to the HSS to download user profiles and upload user-to-S-CSCF associations (the user profile is only cached locally for processing reasons only and is not changed). All necessary subscriber profile information may be loaded from the HSS.

The core network 14 comprises a Media Resource Function Processor (MRFP) 14f. The MRFP is a media plane node used to mix, source or process media streams. It can also manage access right to shared resources.

The core network 14 comprises a Media Resource Function Controller (MRFC) 14e. The MRFC is a signalling plane node that interprets information coming from a TAS and S-CSCF to control the MRFP.

The core network 14 comprises a Session Border Gateway (SBG) 14h. The SBG handles signaling and media control.

The above core network entities 14a-k may be regarded as exemplifying different types of data transport nodes in the communication network 11a.

The communications network 11a further comprises a real-time communication (RTC) helper server (RHS) 16. The RTC helper server 16 will be further described below.

The embodiments disclosed herein relate to provide Web based applications with network information. In order to provide Web based applications with network information there is provided a RTC helper server, a method performed by the RTC helper server, a computer program comprising code, for example in the form of a computer program product, that when run on a RTC helper server, causes the RTC helper server to perform the method.

Figure 1B:
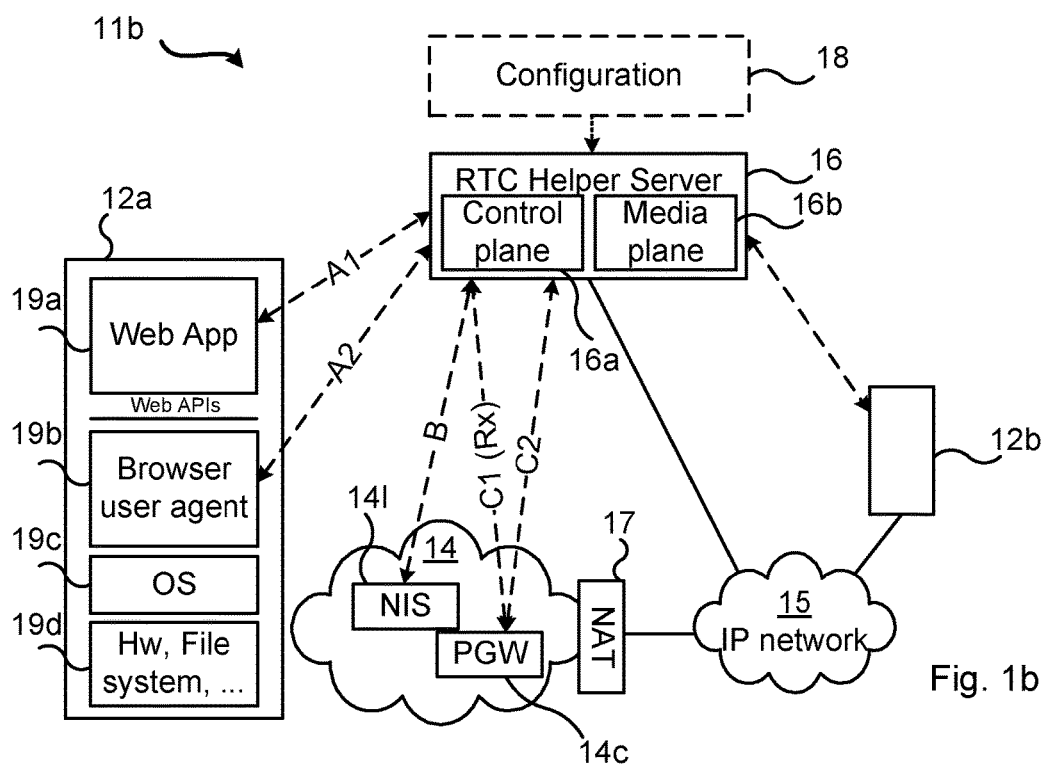

FIG. 1b shows a schematic overview of a RTC helper server 16 and examples of its interfaces to other entities and devices in a communications network 11b. The RTC helper server 16 comprises a control plane module 16a and a media plane module 10, the functionalities of which will be further described below. The RTC helper server 16 has access to configuration information 18. The configuration information 18 may be stored in a database in a server.

The RTC helper server 16 is configured to interact with the UEs 12a and 12b via interfaces A1 and A2. The RTC helper server 16 is configured to interact with the NIS 14l via interface B. The RTC helper server 16 is configured to interact with the PGW 14c via interfaces C1 and C2. Each UE 12a, 12b comprises a Web application 19a, at least one Web API 19b, a browser (or user agent) 19c, an operating system (OS) 19d, and hardware (Hw), file system, etc. 19d. A network address translator (NAT) 17 may be provided interfacing the core network 14 and the IP network 15.

The enclosed embodiments concern using information about and from the mobile broadband radio layer, including but not limited to radio base stations and network controllers to enhance applications with real time media included, such as speech and video, in client end-point devices implemented using web runtimes, in particular browsers. The information provided by the herein provided mechanisms may be applied in the media plane, the control plane or the management plane before, during and after individual sessions. In a case where information is exchanged between business actors, one providing the application and another providing the mobile access resulting in an API between constituent layers and components, the exposure layer itself may be affected.

Figure 2A:
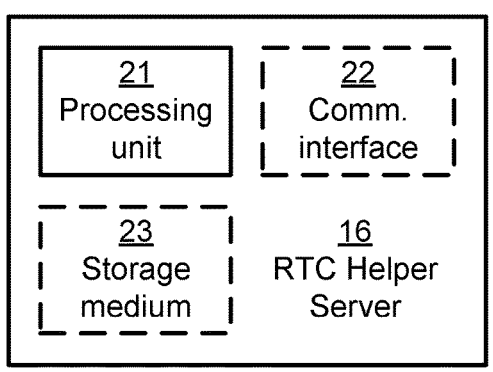
FIG. 2a is a schematic diagram showing functional modules of a real-time communication helper server according to embodiments.

FIG. 2a schematically illustrates, in terms of a number of functional modules, the components of a RTC helper server 16 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 3), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The RTC helper server 16 may further comprise a communications interface 22 for receiving and providing information to other modules and devices in the communications network 11a, 11b. The processing unit 21 controls the general operation of the RTC helper server 16, e.g. by sending data and instructions to the storage medium 23, retrieving data and instructions from the storage medium 23, sending control signals to the communications interface 22, and receiving reports from the transmitter communications interface 22 of its operation. Other components, as well as the related functionality, of the RTC helper server 16 are omitted in order not to obscure the concepts presented herein. The RTC helper server 16 may be provided as a standalone device or as a part of a further device.

Figure 2B:
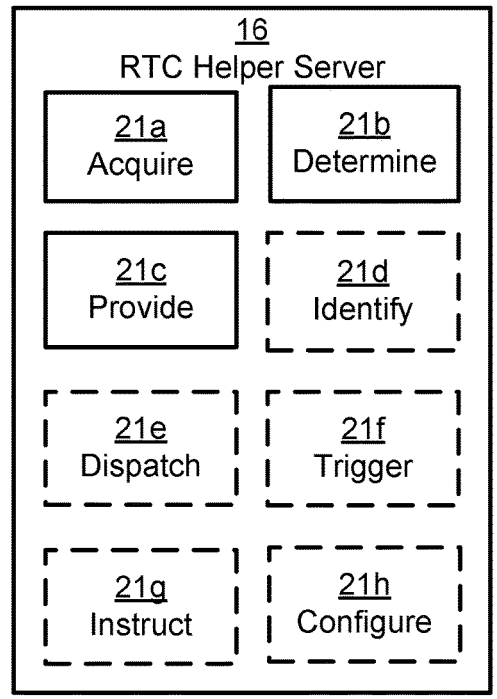
FIG. 2b is a schematic diagram showing functional units of a real-time communication helper server according to embodiments.

FIG. 2b schematically illustrates, in terms of a number of functional units, the components of a RTC helper server 16 according to an embodiment. The RTC helper server of FIG. 2b comprises a number of functional units; an acquire unit 21a, a determine unit 21b, and a provide unit 21c. The RTC helper server 16 of FIG. 2b may further comprises a number of optional functional units, such as any of an identify unit 21d, a dispatch unit 21e, a trigger unit 21f, an instruct unit 21g, and a configure unit 21h. The functionality performed by each functional unit 21a-h will be further disclosed below in the context of which the functional units may be used; all herein disclosed steps of acquiring may be performed by the acquire unit 21a; all herein disclosed steps of determining may be performed by the determine unit 21b; all herein disclosed steps of providing may be performed by the provide unit 21c, and likewise for steps corresponding to the functional modules 21d-h. In general terms, each functional unit 21a-h may be implemented in hardware or in software. The processing unit 21 may thus be arranged to from the storage medium 23 fetch instructions as provided by a functional unit 21a-h and to execute these instructions, thereby performing any steps as will be disclosed hereinafter.

Figure 2C:
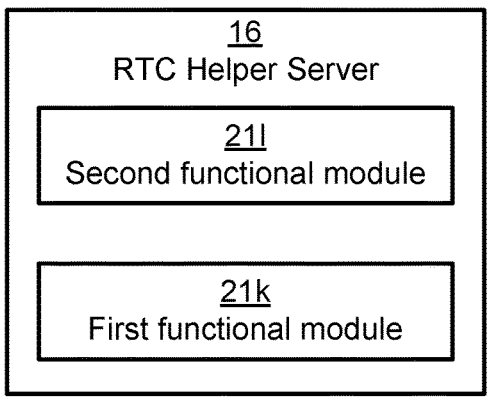
FIG. 2c is a schematic diagram showing functional modules of a real-time communication helper server according to embodiments.

FIG. 2c schematically illustrates, in terms of a number of functional modules, the components of a RTC helper server 16 according to an embodiment. The RTC helper server of FIG. 2c comprises a first functional module 21k and a second functional module 21l. The first functional module 21k may be a control plane module 16a. The second functional module 21l may be a media plane module 16b.

Figure 3:
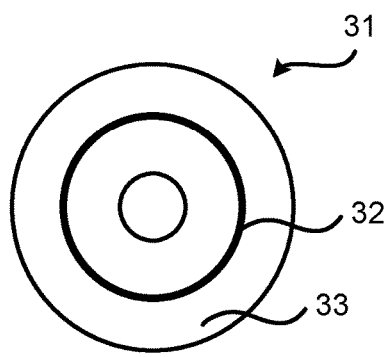
FIG. 3 shows one example of a computer program product comprising computer readable means according to an embodiment.

FIGS. 4, 5, 6, and 8 are flow charts illustrating embodiments of methods for providing Web based applications with network information. FIG. 7 is flow charts illustrating embodiments of methods for receiving such network information by Web based application. The methods are performed by the RTC helper server. The methods are advantageously provided as computer programs. FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the storage medium 23, and/or the communications interface 22 to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 32 is here schematically shown as a track on the depicted optical disk, the computer program 32 can be stored in any way that is suitable for the computer program product 31.

Figure 4:
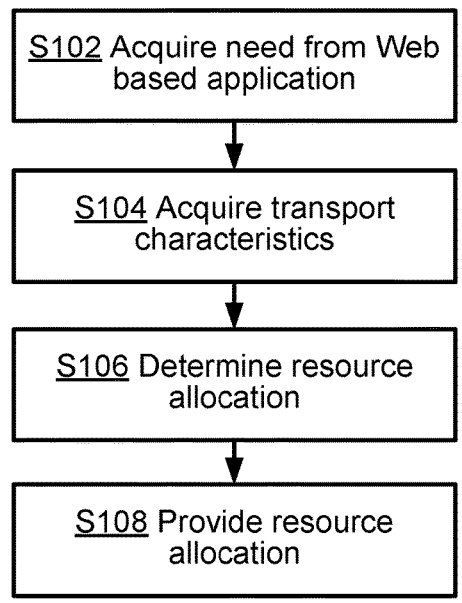
FIGS. 4, 5, 6, 7, and 8 are flowcharts of methods according to embodiments.

Reference is now made to the flowchart of FIG. 4 disclosing a method for providing Web based applications with network information according to an embodiment. In general terms, some of the variations during transport of multimedia flows between two network hosts may come from a cellular link. In such a link, there are entities with better ability than other entities to predict the bitrate on their portion of the cellular link. In particular, the radio schedulers in a mobile access has insights in such factors that may cause the variation since this information is used when the radio schedulers perform operations relating to controlling and handing out radio resources to devices within range and managing mobility of these devices. This and other mobile broadband entities may together provide information about upcoming changes in the transport that can be useful for the endpoints in their rate control processes. In case of browser end points, such network feedback needs to be designed recognizing the split of responsibility and control between the Web application and the browser WebRTC media framework.

In enabling the network to assist in predicting the upcoming, available bitrate, information about the application such as type of flows, flow characteristics and behavior when adapting to rate changes may be useful, since this will add to the ability to predict available bitrate.

In general terms, in a Web and IP platform context perfect coordination of the end point media framework and the radio scheduler state machines is partly in conflict with the layering principles but also with other design goals such as security and efficient use of other critical resources. This result in a need for an intelligent application level proxy/ helper server that manages the complexity in interacting with the mobile broadband providing bandwidth information, mapping this information onto application needs and forwarding the information to the endpoints, such as web applications and browser media frameworks.

The RTC helper server 16 is operative to, in a step S102, acquire a need for a Web based application to transmit a real time media flow. The acquiring may be performed by executing functionality of the acquire unit 21a. The computer program 32 and/or computer program product 31 may thus provide means for this acquiring. The RTC helper server 16 is operative to, in a step S104, acquire transport characteristics relating to transmission of said real time media flow over a communications network. The acquiring may be performed by executing functionality of the acquire unit 21a. The computer program 32 and/or computer program product 31 may thus provide means for this acquiring. The RTC helper server 16 is operative to, in a step S106, determine, from said acquired transport characteristics and according to a policy criterion, a resource allocation to said real time media flow. The determining may be performed by executing functionality of the determine unit 21b. The computer program 32 and/or computer program product 31 may thus provide means for this determining. The RTC helper server 16 is operative to, in a step S108, provide said determined resource allocation to at least one of the Web based application and a browser associated with said Web based application. The providing may be performed by executing functionality of the provide unit 21c. The computer program 32 and/or computer program product 31 may thus provide means for this providing. The Web based application may be a WebRTC based application. The Web based application may be a Object RTC (ORTC) based application Reference is now made to the flowchart of FIGS. 5, 6, 7 and 8 disclosing methods for providing Web based applications with network information according to further embodiments.

The resource allocation may relate to different network properties. One example is bitrate. Hence according to an embodiment the resource allocation is available bitrate for transmission of the real time media flow.

There may be different examples of communications network. One example of a communications network where the herein disclosed subject matter may apply is a mobile broadband communications network.

There may be different ways to acquire the transport characteristics for the communications sessions. For example, the transport characteristics for the communications sessions may be associated with a communications session. The RTC helper server 16 may be operative to, in an optional step S104a, identify communications sessions associated with the transmission of the real time media flow; and, in an optional step S104b, acquire the transport characteristics for the communications sessions based on the identified communications sessions.

There may be different ways to determine whether or not a communications session should be established for the transmission of the real time media flow. The RTC helper server 16 may for example be operative to, in an optional step S106a, determine the acquired transport characteristics to be below a predetermined quality value as set by the policy criterion; and as a result thereof, in an optional step S106b, dispatch an event to an error handler. The event may cause the communications session not to be established, and hence the real time media flow not to be transmitted. Hence the real time media flow may not be transmitted if the transport characteristics indicate that QoS is below the predetermined quality value.

There may be different ways to determine whether or not to perform reconfiguration of the Web based application. One such trigger may be the policy criterion. The RTC helper server 16 may thus be operative to, in an optional step S106c, trigger reconfiguration of the Web based application based on the policy criterion.

There may be different ways to determine whether or not to perform reconfiguration of transport links on which the real time media flow are transmitted. One such trigger may be the policy criterion. The RTC helper server 16 may thus be operative to, in an optional step S106d, trigger reconfiguration of the transport links based on the policy criterion.

As noted above, the Web based application is run by a UE 12a, 12b. The RTC helper server 16 may configure properties of the UE 12a, 12b relating to transmission of the real time media flow. The RTC helper server 16 may thus be operative to, in an optional step S106e, configure transmission properties of the user equipment for transmission of said real time media flow. There may be different types of transmission properties. Examples of the transmission properties include, but are not limited to, media encoding mode (e.g., how to encode the audio or video), media packetization mode, packet sizes, burst sizes, frame resolution setting, frame rate setting, priority tagging of individual media frames (e.g., tagging different video frames with different priorities for dropping when bitrate changes), enabling and disabling forward error correction, and enabling and disabling packet retransmission.

Further information may be provided to the Web based application and/or the browser. This further information may, for example, relate to a change of transport usage. The change of transport usage may relate to individual traffic flow of the real time media flow. The RTC helper server 16 may be operative to, in an optional step S104c, acquire information relating to a change of transport usage for an individual traffic flow of the real time media flow; and, in an optional step S108a, provide the information to at least one of the Web based application and the browser. The information may for example relate to differentiated services code point (DSCP) an initial bandwidth, and/or a maximum allowed bandwidth of the individual traffic flow.

The determined resource allocation, as provided in step S108, may represent instructions for the Web based application and the browser to comply with. The RTC helper server 16 may be operative to, in an optional step S108b, instruct at least one of the Web based application and the browser to comply with the resource allocation. In general terms, the determined resource allocation, as provided in step S108, may represent either a recommendation (which thus does not need to be followed) or instructions (which thus are to be followed) to comply with. Hence, the RTC helper server 16 may be operative to, in an optional step S106f, determine whether to provide the determined resource allocation as a recommendation or as an instruction to comply with.

There may be different types of configuration information for the RTC helper server 16 to consider. One example is session initialization information. The RTC helper server 16 may be operative to, in an optional step S104d, acquire configuration information for the Web based application from a policy server. The configuration information may for example relate to session initialization information. The RTC helper server 16 may be operative to, in an optional step S104e, acquire the policy criterion from a policy server.

The RTC helper server 16 may be operative to, in an optional step S104f, acquire network information from a network information system 14l. The RTC helper server 16 may be operative to, in an optional step S104g, acquire a time indicator from the network information system 14l, the time indicator indicating a time interval from reception of the network information to usage of the network information by at least one of the Web based application and the browser.

Figure 6:
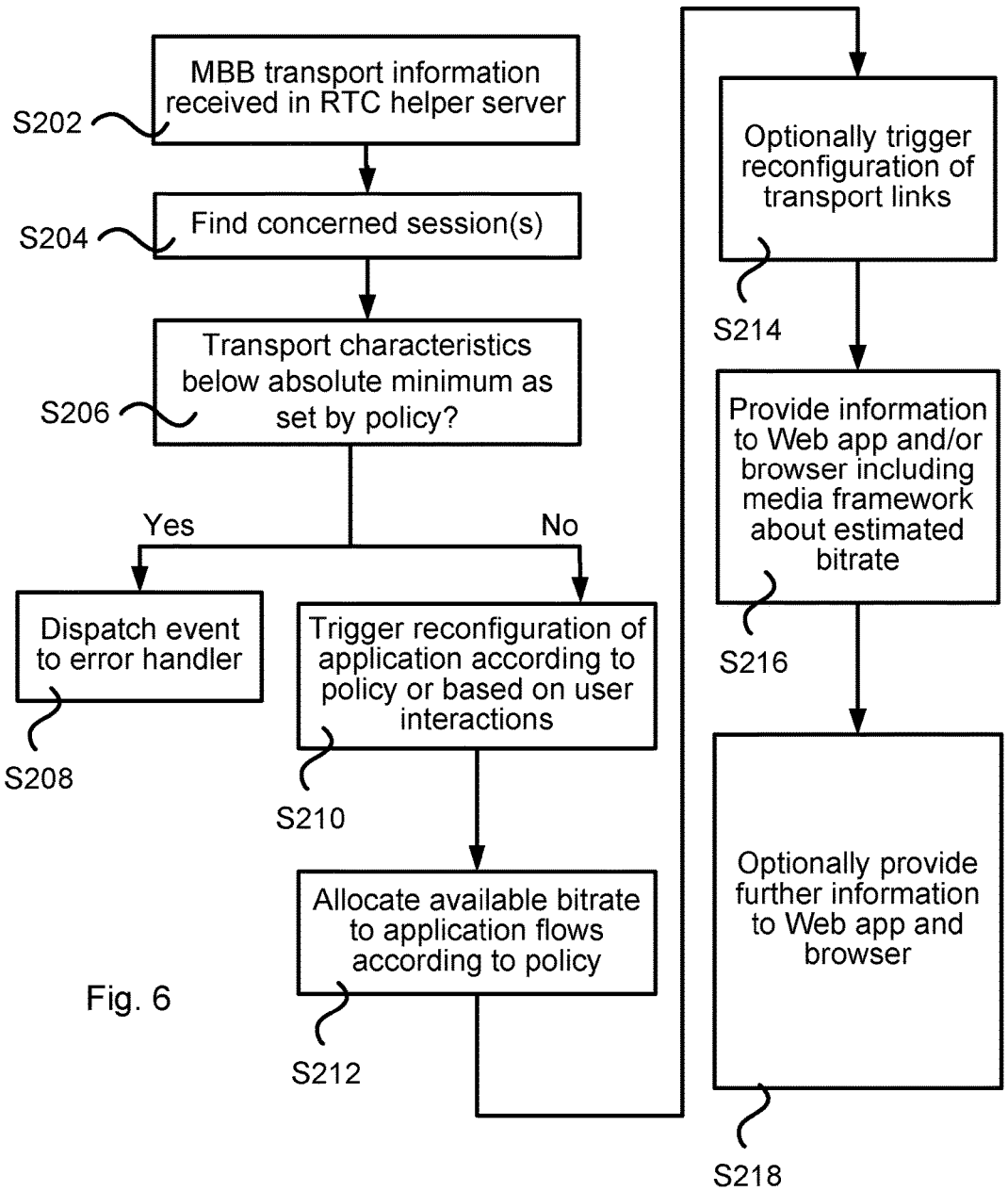
Figure 7:
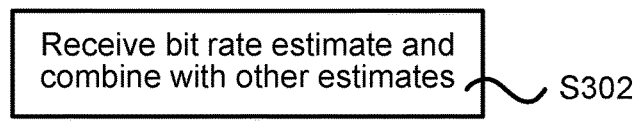

According to the flowchart of FIG. 6 a method for providing Web based applications with network information comprises at least some of the following steps:

S202: MBB transport information received.
S204: Find concerned session(s).
S206: Check if transport characteristics below absolute minimum as set by policy.
S208: (If yes in step 206) Dispatch event to error handler.
S210: (If no in step 206) Trigger reconfiguration of Web application according to policy or based on user interactions.
S212: Allocate available bitrate to application flows according to policy.
S214: Optionally, trigger reconfiguration of transport links, e.g. requesting MBB QoS.
S216: Provide information to Web application and/or browser including media framework about estimated bitrate.
S218: Optionally, and if applicable, provide information to Web application and browser about changing usage of transport, e.g. DSCPs, start bandwidth, maximum allowed bandwidth for an individual flow.

Steps 202-218 may be performed by the RTC helper server 16. The storage medium 23 may thus comprise such instructions executable by the processing unit 21 and enabling the RTC helper server 16 to perform these steps.

According to the flowchart of FIG. 7 a method for a Web based application to receive network information comprises at least the following step:

S302: Receive bitrate estimate from RTC helper server and combine with other estimates received from other entities for use during transmission of real time media flows.

Figure 8:
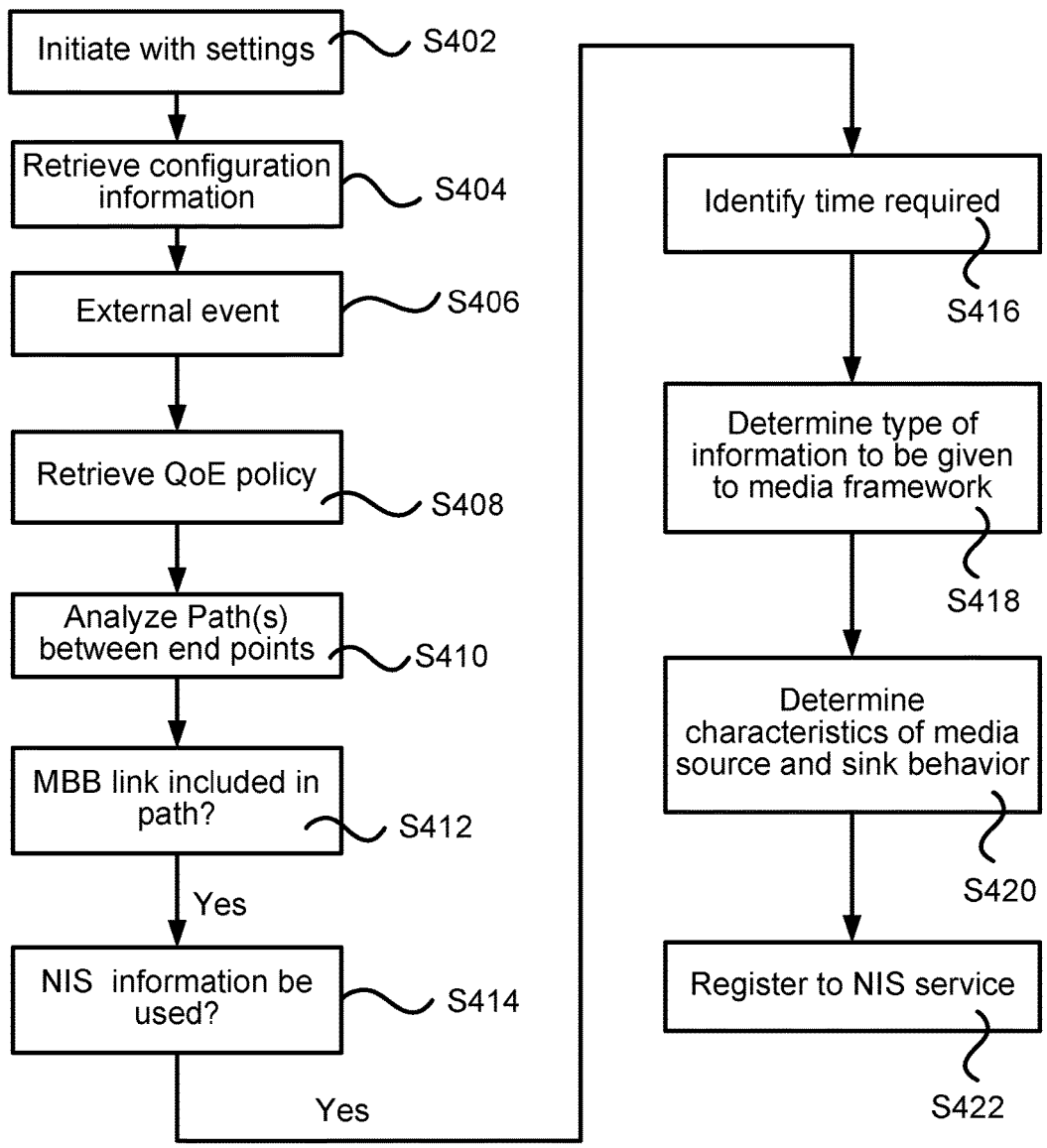

According to the flowchart of FIG. 8 a method for providing Web based applications with network information comprises at least some of the following steps:

S402: Initiate RTC helper server with settings.
S404: Retrieve configuration information from external policy server.
S406: External event: Session initialization including at least information about media and data flows, transport path between endpoints such as IP addresses; and optionally, allow Web applications to register for information from the RTC helper server.
S408: Retrieve QoE policy for services associated with the session from an external entity.
S410: Analyze communications path(s) between end points (device 12a and device 12b).
S412: Check if MBB link included in the path between endpoints.
S414: (If yes in step S412) Check policy if MBB NIS information shall be used.
S416: (If yes in step S414) Identify time required from NIS information sent from NIS system to when applied in sender of media.
S418: Determine type of information to be given to media framework: recommendation or instruction.
S420: Determine characteristics of media source and sink behaviour at varying bitrates.
S422: Register for feedback in appropriate NIS service. Include information about where to send information. Optionally include information about source and sink behaviour, time from transfer of NIS to sender.

Steps 402-422 may be performed by the RTC helper server 16. The storage medium 23 may thus comprise such instructions executable by the processing unit 21 and enabling the RTC helper server 16 to perform these steps.

Figure 5:
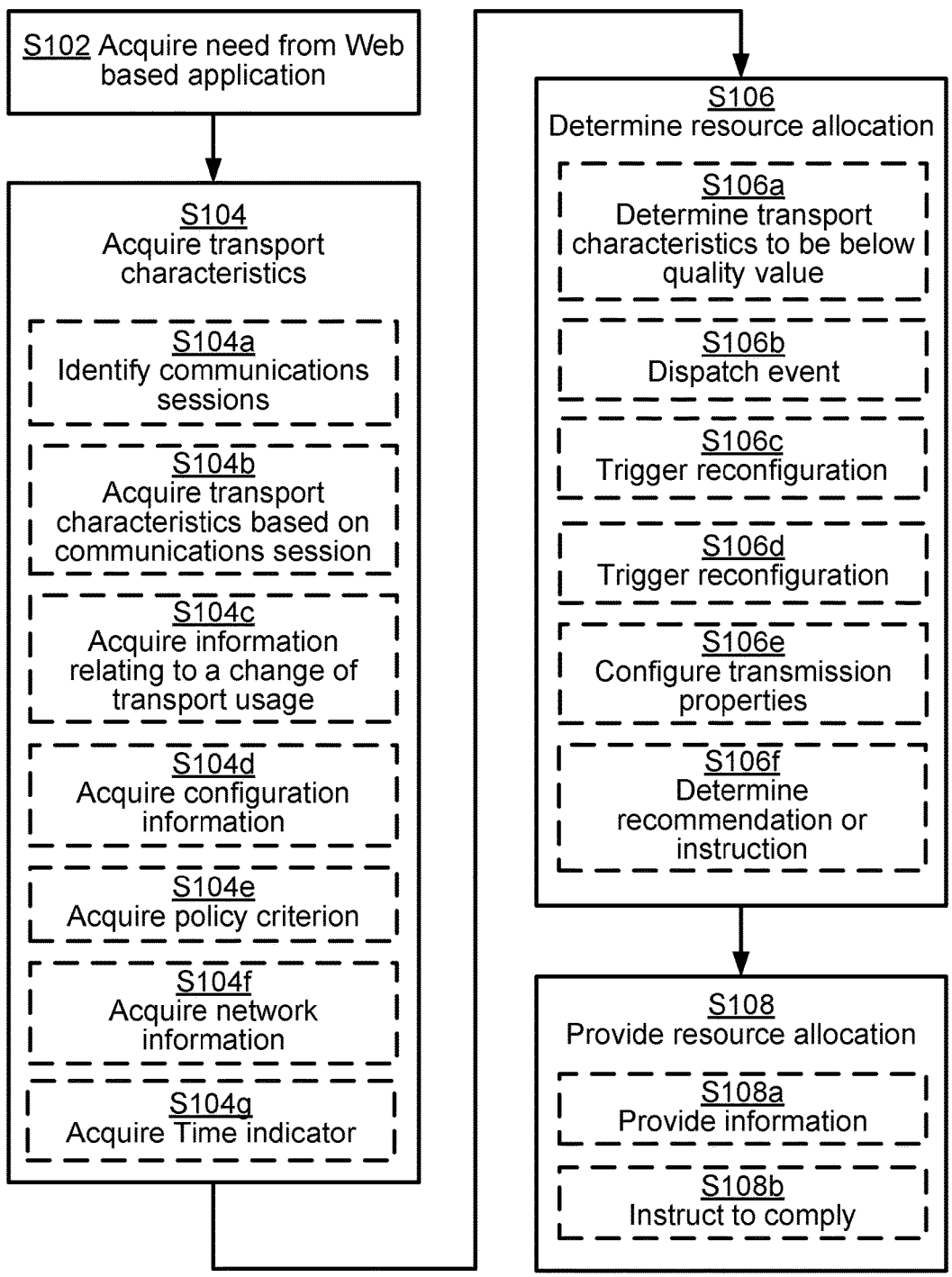

The steps of FIGS. 6, 7, and 8 may be combined with any steps of FIGS. 4 and 5, mutatis mutandis.

Consider an example situation with two devices 12a and 12b operatively connected to an IP network as in FIG. 1. Assume that device 12a accesses the IP network via a mobile broadband access.

Assume further that both devices 12a and 12b have web browsers supporting RTC and web pages (web applications) loaded into them from a web server (not illustrated). Assume further that both web applications include logic and data enabling them to use the browser Web API as well as to find and connect with each other using a signaling server in the communications network.

In this illustrative example, the herein disclosed RTC Helper Server will take the role of also supporting the web applications in the browsers with functionality to find and connect the peers. This means that the RTC Helper Server will also be part of the exchange of descriptions of media and transport between the two browsers used in establishing the media tracks between the two devices 12a and 12b.

The RTC Helper server may be a part of the web application or a stand-alone support service provided by a separate actor. In the following description, it is, for illustrative purposes, regarded as a part of the application.

The Web application may request support from the RTC Helper server before and during a communications session via an interface A1. Information about available bitrate, etc. as provided by the RTC Helper server before an RTC connection is established can be used by the Web application to decide what and how to interact with the user, e.g. whether to on a user interface, such as display an icon, indicate that a particular service, such as a video chat, is possible or not.

The Web application and the browser may jointly gather information relevant to set up Web connections, such as information about local and remote IP addresses used to traverse network address translations (NATs) 17, media capabilities, security credentials, user consent, etc. This information is enclosed into messages exchanged with a peer Web application and browser as well as intermediate entities, such as the RTC Helper server.

As mentioned above, the RTC Helper Server may aid Web applications and browsers to find and connect to each other. This includes, but is not limited to, providing end-to-end connectivity e.g. using webSockets. This may imply the RTC Helper Server to be a part of the session establishment between the devices 12a and 12b. A session establishment event can be one trigger of the RTC Helper Server obtaining MBB bitrate information using a network information (NIS) service, but this may also be performed on direct request by the Web application.

The RTC Helper Server connects to the NIS service via interface B and request information (uplink information, downlink information, or both). The NIS may respond with information related to expected bitrate for packets on a particular queue to a bearer to the device.

There may be more than one packet flow identified by IP header information such as IP address, ports, flow labels, differentiated services code point (DSCP) tag, etc. on a radio bearer. The NIS may not be able to detect, or separate, between different flows. Hence, the bitrate predictions for the bearer may need to be broken down into bitrates per flow. This may be performed by the RTC Helper Server which may have access to such information, either by inspecting the session description information exchanged when establishing or changing the session or by an explicit message from the application. Yet another source of information is an application description from an external source.

The RTC Helper server may also be enabled to change how available bitrates are spread among application flows, following an externally created policy. This policy may further include rules for when to drop application flows or the session altogether, assuming the RTC Helper Server is configured accordingly, or change the flow characteristics by means such as pausing flows, transcoding flows by including a media processing entity in the media plane.

The RTC Helper server may also be enabled to change the configuration of existing traffic flows by changing the maximum bitrate individual traffic flows or groups of traffic flows may use, e.g., by measurements using a leaky bucket model.

In case the RTC Helper Server is not enabled or not allowed to control the behavior of the application, the RTC Helper Server may provide bitrate information (so-called hints) per application flow to the Web application, enabling the Web application to take actions to reconfigure itself and/or the browser to adapt to using the Web API.

The information provided by the NIS may, according to one example, reach the browser media framework with the rate controller for the Web audio, video and datagram flow via the browser Web API. As mentioned before, the standard browser model may not assume a trust in the web page. The rate control process may be regarded as an integer part of the IP platform flow and congestion control meaning there are essential requirements on the herein provided mechanisms to ensure protection of the network and peer host from overload and providing of fairness between users as well as efficient usage of resources. An untrusted Web application may not be allowed to negatively influence these essential processes which are why the standard Web API may limit its abilities to interact with the media framework. According to another example, the information provided by the NIS may be used to trigger IP congestion or flow control mechanisms without involving the Web application. Examples include, but are not limited to, triggering of ECN (Explicit Congestion Control) or using a RTCP TMBR process in an intermediate media server. According to yet another example, a trust relation is assumed between the browser (media framework or OS) and the RTC Helper Server, allowing the latter to directly feed information to the former, without including the untrusted Web Application.

The behavior of the RTC Helper Server towards the devices 12a and 12b will depend on the Web application realization, Browser capabilities and available means of interacting with these. Hence, the RTC Helper Server may be configured to handle different device capabilities.

According to an example the media framework realization may have an internal rate adaptation processes that may include bandwidth predictions of the path between the devices 12a and 12b. These processes are typically based on the information it obtains in RTCP or other IP signaling available to the end-point. In this process, external information from the NIS and RTC Helper server may be used. The NIS may report bitrate predictions, typically in the order of every 200 ms, or so (configurable). Such information may be used in both downgrading and upgrading the predictions in the media framework. In doing this, the incoming bitrate prediction per flow may be combined with the internal media framework prediction. To assist the media framework in correlating the external information in time, a time stamp or other time indicating information for the prediction may be included as well as means for relating the clocks of the devices 12a and 12b and the network entities. According to another example, there may be several mobile broadband links in an end-to-end path, in which case the RTC Helper Server may combine information provided by the NIS before informing the Web Application and/or Browser.

The point in time from when the prediction is made by the NIS to the point in time when the media framework applies the recommendation should be short and known for the NIS. In general terms, the higher the delay to apply, the more cautious the prediction made by the NIS needs to be. Hence, the RTC Helper Server may be configured to, for every instance of a session, determine the delay for the feedback. For this purpose, the RTC Helper Server may use measurements, estimates and topology information.

The NIS prediction itself may depend at least partly on the media framework ability to follow the NIS prediction and to follow the NIS prediction fast enough. Consequently, the NIS may by the RTC Helper Server be provided with such information over the A1 interface.

The NIS may further be helped by a-priori knowledge about the actions the media framework will take. The RTC Helper Server, possibly together with the Web Application and possibly complemented by a separate, external information source, may be configured to gather and provide the NIS with such information.

The mobile broadband network often uses private IP addresses, using NAT techniques towards other IP networks such as Internet. Thus, a NAT may be required in the path between device 12a and device 12b, translating the public IP address to the internal IP address.

According to an example, the NIS may intercept the procedure between the PGW and device 12a assigning a private IP address and thus maintain a database of devices identified by the private IP for which it can provide radio link bitrate recommendations. The application using the NIS service via the A1 interface may therefore be required to be able to express its request for information for a device identified by the (possibly) private address.

One mechanism for accomplishing this is using ICE signaling where the browser (using OS services) collects local interface and remote interface IP candidates and exposes this information for the Web Application to exchange with the peer via application level signaling. This procedure may also include gathering information about which external, remote interface that is associated to which local interface. Assuming the RTC Helper Server is part of this signaling, or that the Web application signals this information separately, the RTC Helper server will have access to the information and be configured to request information from the NIS over the A1 interface using local or remote interface.

The NIS or the radio scheduler may be aware of the individual IP flows. In examples relating thereto, the application on the B interface need only to indicate which flows that it is interested in, e.g., by using a 5-tuple or a 6-tuple.

For flows following a standard Web congestion and flow control behavior, a default DSCP code point can be set, meaning that each packet will carry a pointer to information describing the behavior in different situations of the Web flows, both on sender and receiver side. Such information may be used to configure the NIS prediction as well as the MBB schedulers. The RTC Helper Server may contextualize the information describing variations in the behavior of the Web receiver and sender and other sources in the browser (e.g. from other Web applications) that produce flows that end up on the same bearer.

The RTC Helper server (at least the control plane module) is configured to, via interface A1, interact with the Web Application in the device 12a so as to configuring the browser using the WebRTC API and other Web APIs. The RTC Helper server may further provide information intended for use by the Web application for other purposes than interacting with the browser, such as providing user feedback. The RTC Helper server may provide information about available bandwidth before the session for transmission of real time media flow is started, allowing the Web application to decide whether to show a camera icon or not, an action less suitable if the available bandwidth is not sufficient for an appropriate conversational video experience.

In the currently available Web browser security model, the Web application is not trusted to perform actions directly related to the network configuration, such as setting DSCP points, requesting bearers or influence the rate control procedures risking the IP networks flow and congestion control mechanisms to be put out of order. Hence, the browser may instead have a direct interface A2 to the RTC Helper server. The RTC Helper server (at least the media plane module) may convey information to the browser.

In another realization of the browser, the browser may have a control plane interface to the RTC Helper server Control module, including examples such as ICE signaling, HTTP(S), WebSocket, etc.

In yet another realization of the browser, mechanisms for giving a part of a Web application may be seen as trusted in certain contexts, allowing the web application to use private Web APIs to the underlying browser and OS mechanisms not available to ordinary Web applications. Examples of such mechanisms are browser extensions. This type of arrangement may be applicable to private networks.

The RTC Helper server may as part of its function interact, via interface C1, with the MBB system to request QoS or trigger such a process in the MBB The C1 interface may be implemented as an Rx interface. Such initiatives by the RTC Helper server may be a part of actions taken on certain bitrates from the NIS and as per instruction from policy or user interaction or Web application behavior.

By means of interface C2 the RTC Helper server may be able to act on information about the transport between the end points also from other sources than the NIS. For instance, a mobile broadband backbone router may generate transport characteristics related information such as congestion on the backhaul between radio base station and border router. In the same way, other entities on other links in the end-to-end path may generate information to be used by the RTC Helper server using the interface C2. The interface C2 may also include means for the RTC Helper server to trigger use of IP level policing or shaping, e.g. in case if non-well behaved devices.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A real-time communication (RTC) helper server for providing a Web-based application run by a user equipment with network information and for supporting said Web-based application and a browser of said user equipment and for said Web-based application and said browser to find and connect to each other, the RTC helper server comprising a processing unit and a storage medium, said storage medium comprising instructions configured for execution by the processing unit and configured so as to cause the processing unit, during execution of the instructions, to:
   acquire a need for said Web-based application to transmit a real time media flow;
   acquire transport characteristics relating to transmission of said real time media flow over a communications network;
   determine, from said acquired transport characteristics and according to a policy criterion, a resource allocation to said real time media flow; and
   provide said determined resource allocation to at least one of the Web-based application and said browser;
wherein the instructions are further configured so that the processing unit is operable to perform any one or more of the following:
   to trigger reconfiguration of said Web-based application based on said policy criterion;
   to trigger, based on said policy criterion, reconfiguration of transport links on which said real time media flow is transported; and
   to configure transmission properties of the user equipment for transmission of said real time media flow.

2. The RTC helper server of claim 1, wherein said resource allocation is an available bitrate for transmission of said real time media flow.

3. The RTC helper server of claim 1, wherein said communications network is a mobile broadband communications network.

4. The RTC helper server of claim 1, wherein the instructions are further configured to cause the processing unit to:
   identify communications sessions associated with said transmission of said real time media flow; and
   acquire said transport characteristics for said communications sessions associated with said communications sessions.

5. The RTC helper server of claim 1, wherein the instructions are further configured to cause the processing unit to:

determine said acquired transport characteristics to be below a predetermined quality value as set by said policy criterion; and, as a result thereof, dispatch an event to an error handler.

6. The RTC helper server of claim 1, wherein the instructions are configured to cause the processing unit to trigger said reconfiguration of said Web-based application based on said policy criterion.

7. The RTC helper server of claim 1, wherein the in instructions are configured to cause the processing unit to trigger said reconfiguration of said transport links, based on said policy criterion.

8. The RTC helper server of claim 1, wherein the instructions are configured to cause the processing unit to configure said transmission properties of the user equipment for transmission of said real time media flow.

9. The RTC helper server of claim 8, wherein said transmission properties comprises any of media encoding mode, media packetization mode, packet sizes, burst sizes, frame resolution setting, frame rate setting, priority tagging of individual media frames, enabling and disabling forward error correction, enabling and disabling packet retransmission.

10. The RTC helper server of claim 1, wherein the instructions are further configured to cause the processing unit to:

acquire information relating to a change of transport usage for an individual traffic flow of said real time media flow; and provide said information to at least one of the Web-based application and said browser.

11. The RTC helper server of claim 10, wherein said information relates to at least one of differentiated services code point, DSCP, an initial bandwidth, and a maximum allowed bandwidth of said individual traffic flow.

12. The RTC helper server of claim 1, wherein the instructions are further configured to cause the processing unit to instruct at least one of said Web-based application and said browser to comply with said resource allocation.

13. The RTC helper server of claim 1, wherein the instructions are further configured to cause the processing unit to determine whether to provide said determined resource allocation as a recommendation or as an instruction to comply with.

14. The RTC helper server of claim 1, wherein the instructions are further configured to cause the processing unit to acquire configuration information for said Web-based application from a policy server.

15. The RTC helper server of claim 14, wherein said configuration information comprises session initialization information.

16. The RTC helper server of claim 1, wherein the instructions are further configured to cause the processing unit to acquire said policy criterion from a policy server.

17. The RTC helper server of claim 1, wherein the instructions are further configured to cause the processing unit to acquire network information from a network information system.

18. The RTC helper server of claim 17, wherein the instructions are further configured to cause the processing unit to acquire a time indicator from said network information system, the time indicator indicating a time interval from reception of said network information to usage of said network information by at least one of the Web-based application and said browser.

19. A method, performed by a real-time communication (RTC) helper server, for providing a Web-based application run by a user equipment with network information and for supporting said Web-based application and a browser of said user equipment and for said Web-based application and said browser to find and connect to each other, the method comprising:

acquiring a need for said Web-based application to transmit a real time media flow;

acquiring transport characteristics relating to transmission of said real time media flow over a communications network;

determining, from said acquired transport characteristics and according to a policy criterion, a resource allocation to said real time media flow; and providing said determined resource allocation to at least one of the Web-based application and said browser;

wherein the method further comprises any one or more of any of the following:

triggering reconfiguration of said Web-based application based on said policy criterion;

triggering, based on said policy criterion, reconfiguration of transport links on which said real time media flow is transported; and configuring transmission properties of the user equipment for transmission of said real time media flow.

20. A non-transitory computer-readable medium comprising, stored thereupon, a computer program for providing a Web-based application run by a user equipment with network information and for supporting said Web-based application and a browser of said user equipment and for said Web-based application and said browser to find and connect to each other, the computer program comprising computer program code configured to cause a real-time communication (RTC) helper server executing the computer program code to:

acquire a need for said Web-based application to transmit a real time media flow;

acquire transport characteristics relating to transmission of said real time media flow over a communications network;

determine, from said acquired transport characteristics and according to a policy criterion, a resource allocation to said real time media flow; and provide said determined resource allocation to at least one of the Web-based application and said browser;

wherein the computer program code is further configured to cause the RTC helper sever to perform any one or more of any of the following:

trigger reconfiguration of said Web-based application based on said policy criterion;

trigger, based on said policy criterion, reconfiguration of transport links on which said real time media flow is transported; and to configure transmission properties of the user equipment for transmission of said real time media flow.

* * * * *